US009155116B2

(12) United States Patent
Bukurak et al.

(10) Patent No.: US 9,155,116 B2
(45) Date of Patent: Oct. 6, 2015

(54) METHOD AND APPARATUS FOR PROVIDING FILES TO ELECTRONIC DEVICES

(75) Inventors: David Bukurak, Ottawa (CA); Przemyslaw Abratowski, Milton (CA); Kem-Laurin Kramer, Guelph (CA)

(73) Assignee: BlackBerry Limited, Waterloo, Ontario (CA)

( * ) Notice: Subject to any disclaimer, the term of this patent is extended or adjusted under 35 U.S.C. 154(b) by 406 days.

(21) Appl. No.: 13/049,131

(22) Filed: Mar. 16, 2011

(65) Prior Publication Data

US 2011/0263201 A1   Oct. 27, 2011

Related U.S. Application Data

(60) Provisional application No. 61/327,295, filed on Apr. 23, 2010.

(51) Int. Cl.
| | |
|---|---|
| *H04B 7/00* | (2006.01) |
| *H04W 24/00* | (2009.01) |
| *H04W 76/02* | (2009.01) |
| *H04W 4/00* | (2009.01) |
| *H04W 4/20* | (2009.01) |
| *H04L 29/08* | (2006.01) |
| *H04W 8/00* | (2009.01) |

(52) U.S. Cl.
CPC .............. *H04W 76/023* (2013.01); *H04L 67/06* (2013.01); *H04W 4/00* (2013.01); *H04W 4/008* (2013.01); *H04W 4/206* (2013.01); *H04W 8/005* (2013.01)

(58) Field of Classification Search
CPC .......... G06F 15/16; H04B 7/00; H04B 17/00; H04W 24/00; H04H 40/00
USPC ....................................... 455/41.1, 41.2, 41.3
See application file for complete search history.

(56) References Cited

U.S. PATENT DOCUMENTS

| | | | | |
|---|---|---|---|---|
| 7,512,685 | B2 * | 3/2009 | Lunsford et al. | 709/227 |
| 7,747,223 | B2 * | 6/2010 | Wilson et al. | 455/67.11 |
| 7,831,199 | B2 * | 11/2010 | Ng et al. | 455/3.06 |
| 8,090,767 | B2 * | 1/2012 | Adler et al. | 709/203 |
| 8,155,590 | B2 * | 4/2012 | Hong | 455/41.2 |
| 8,391,787 | B2 * | 3/2013 | Kim | 455/41.2 |
| 8,594,568 | B2 * | 11/2013 | Falck | 455/41.2 |

(Continued)

FOREIGN PATENT DOCUMENTS

WO    WO 2008001064 A1 *  1/2008

OTHER PUBLICATIONS

European Search Report from corresponding EP Application dated May 9, 2011.

*Primary Examiner* — Edward Urban
*Assistant Examiner* — Ralph H Justus
(74) *Attorney, Agent, or Firm* — Fish & Richardson P.C.

(57) ABSTRACT

Method and apparatus for transferring a file from a sending wireless device to a receiving wireless device in a short-range wireless system. A file to be sent to the receiving wireless device is selected on the sending wireless device. The sending wireless device has a device list of receiving wireless devices. If the receiving wireless device is absent on the device list, the sending wireless device searches and identifies new devices. A device among the identified new devices is selected as the receiving wireless device. A connection is established between the sending wireless device and the receiving wireless device; and the file is sent to the receiving wireless device.

24 Claims, 9 Drawing Sheets

(56) References Cited

U.S. PATENT DOCUMENTS

| | | |
|---|---|---|
| 2007/0141989 A1 | 6/2007 | Flinchem |
| 2008/0194203 A1 | 8/2008 | Hong |
| 2009/0177783 A1 | 7/2009 | Adler et al. |
| 2010/0255778 A1* | 10/2010 | Lovell et al. ............... 455/41.2 |

* cited by examiner

METHOD AND APPARATUS FOR PROVIDING FILES TO ELECTRONIC DEVICES

RELATED APPLICATION

This application is related to and claims priority from U.S. Provisional Application Ser. No. 61/327,295, filed on Apr. 23, 2010, entitled "Method and Apparatus for Providing Files to Electronic Devices" by David Bukurak, Przemyslaw Abratowski, and Kem-Laurin Kramer, the entire disclosure of which is hereby incorporated by reference for all purposes.

FIELD OF THE DISCLOSURE

The present patent disclosure relates generally to communication of information between electronic devices and in particular to providing information between wireless devices.

BACKGROUND

Short-range wireless systems provide interconnections between wireless devices, and wireless accessories. Generally, short-range wireless systems use a wireless personal area network (PAN), which uses low-cost, low-power wireless devices that have a typical range of tens of meters.

An example of a wireless PAN technology uses the Bluetooth™ communication protocol. Bluetooth™ operates in the 2.4 GHz Industrial, Scientific, and Medical (ISM) band and provides a peak air-link speed of one Mbps and a power consumption low enough for use in personal, portable electronics such as a personal digital assistance or mobile phone.

A piconet is a network linking a group of wireless devices that are physically close enough to exchange information using, for example, Bluetooth™. Wireless devices join and leave the network as they enter and exit the proximity of the remaining wireless devices. Each Bluetooth™ device is capable to find other Bluetooth™ devices as they enter and leave the effective range of the short-range wireless network. The requesting Bluetooth™ device, operating in a client role, and the responding Bluetooth™ device, operating in a server role, establish a proximity link between the two devices in a process called pairing. Two devices need to be paired at least once to communicate with each other. A pairing may be established through a semi-automatic process. For example, a wireless device may send a signal identifying itself as a Bluetooth™-enabled device. A second wireless device, such as a mobile phone, detects this signal and thus determine that the first wireless device is available for pairing. The second device then prompts the user to enter a "passcode" or "PIN code" for the accessory. Once a pairing has been established, it is remembered by the devices, which can then connect to each other without user intervention.

Other examples of wireless PAN technology include Infrared Data Association (IrDA), Ultra-Wideband (UWB), Z-Wave and ZigBee.

Today's wireless devices, such a BlackBerry phone, for example, are also multi-function devices which can function, for example, as a camera, as an audio recorder or as a video camera to record movies. A user of a wireless device may take a picture or record an audio clip, and wish to share the file with other users.

Currently, when a user desires to share a file with another user, the sending wireless device needs to be connected, associated, and, in the non-limiting example of a Bluetooth™ device, paired with the receiving wireless device. In the example of a Bluetooth™ device, this often requires numerous manual steps to pair these two devices.

Therefore, there is a need to provide an approach to transfer a file from a sending wireless device to a receiving wireless device which minimizes the user's intervention and maximizes the user's experience.

BRIEF DESCRIPTION OF THE DRAWINGS

These and other features of the patent disclosure will become more apparent from the following description in which reference is made to the appended drawings wherein.

DETAILED DESCRIPTION OF EMBODIMENTS

In accordance with one aspect of the present patent disclosure there is provided a method for transferring a file from a sending wireless device to a receiving wireless device in a short-range wireless system. A file to be sent to the receiving wireless device is selected on the sending wireless device. The sending wireless device has a device list of receiving wireless devices. If the receiving wireless device is not present on the device list, new devices are searched and identified. A device among the identified new devices may be identified as a new receiving wireless device. A connection between the sending wireless device and the receiving wireless device is then established, and the file is sent to the receiving wireless device.

In accordance with another aspect of the present patent disclosure there is provided a computer readable storage medium storing instructions or statements for use in the execution in a processor of the method described above.

In accordance with another aspect of the present patent disclosure there is provided a wireless device used in a short-range wireless system, the wireless device comprising: a transceiver for communicating with a receiving wireless device; a memory including a device list; and a processor for: selecting, on the sending wireless device, a file to be sent to the receiving wireless device, the sending wireless device having a device list of receiving wireless devices; ensuring the receiving wireless device is absent on the device list; searching and identifying new devices; selecting a device among the identified new devices as the receiving wireless device; establishing a connection between the sending wireless device and the receiving wireless device; and sending the file to the receiving wireless device.

In accordance with one aspect, short-range wireless system is a Bluetooth™ system; and the connection is established through pairing the sending wireless device with the receiving wireless device.

In accordance with another aspect, the device list is a paired device list.

The short-range wireless system may use one of Infrared Data Association (IrDA), Ultra-Wideband (UWB), Z-Wave or ZigBee, or any other short-range wireless protocol.

In accordance with one aspect, the short-range wireless system is a wireless personal area network (PAN).

The receiving mobile device may be selected from a group consisting of: a mobile phone, an audio player, an adapter for portable devices, an adapter for home entertainment device, a personal computer, a personal digital assistants (PDA), a digital camera, a Global Positioning System (GPS) and a video game console.

Figure 1:
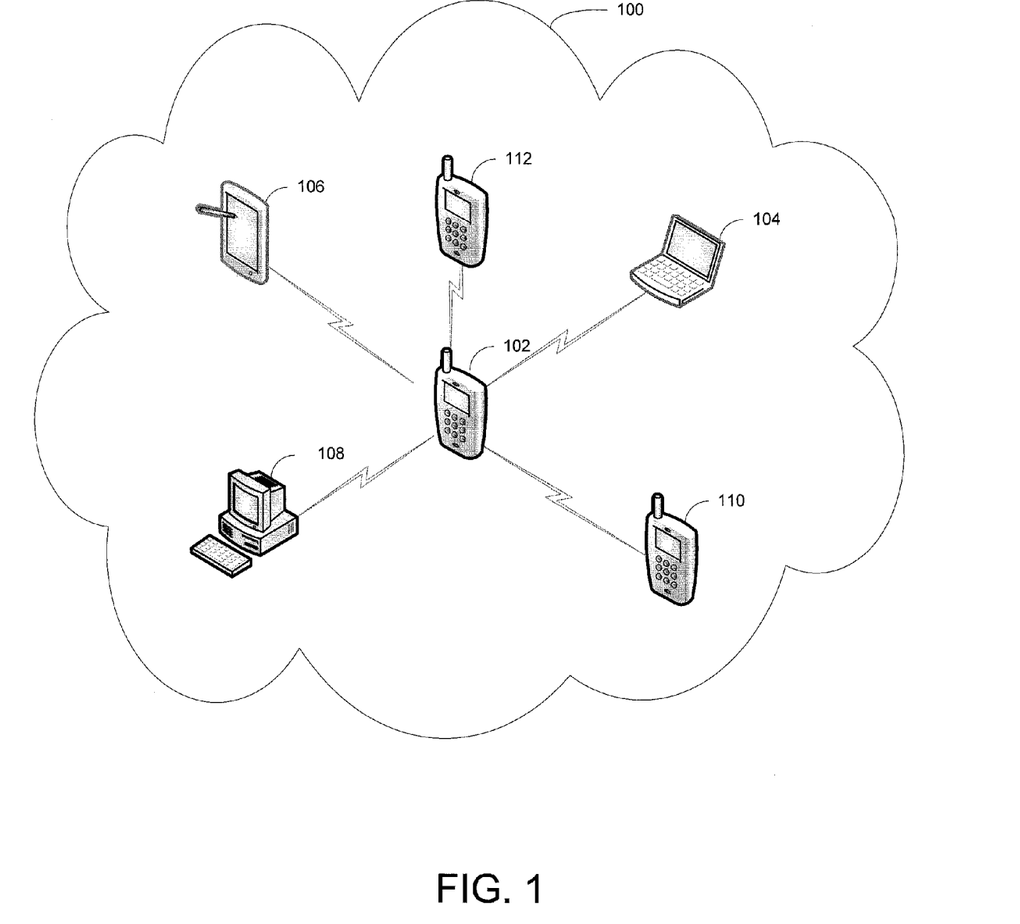
FIG. 1 is an overview of a short-range wireless system in which the present patent disclosure may be implemented.

Referring to FIG. 1, a short-range wireless system 100 in which the present patent disclosure may be implemented is shown. A wireless device, for example but not limited to, a mobile phone 102 is in communication with a plurality of wireless devices (five shown): a laptop 104, a tablet computer 106, a personal computer 108, and two mobile phones 110 and 112.

The term "wireless device" is intended to describe a device used in a short-range wireless system. Examples of wireless device may include, for example but not limited to, mobile phones; smart phones; portable devices such as personal music players; home entertainment devices such as home stereo system; personal digital assistants (PDA); pagers; Global Positioning System (GPS) receivers; digital cameras; video game consoles, "hands-free" automotive kits, tablet computing devices, and other devices capable of communicating in a short-range wireless system.

Figure 2:
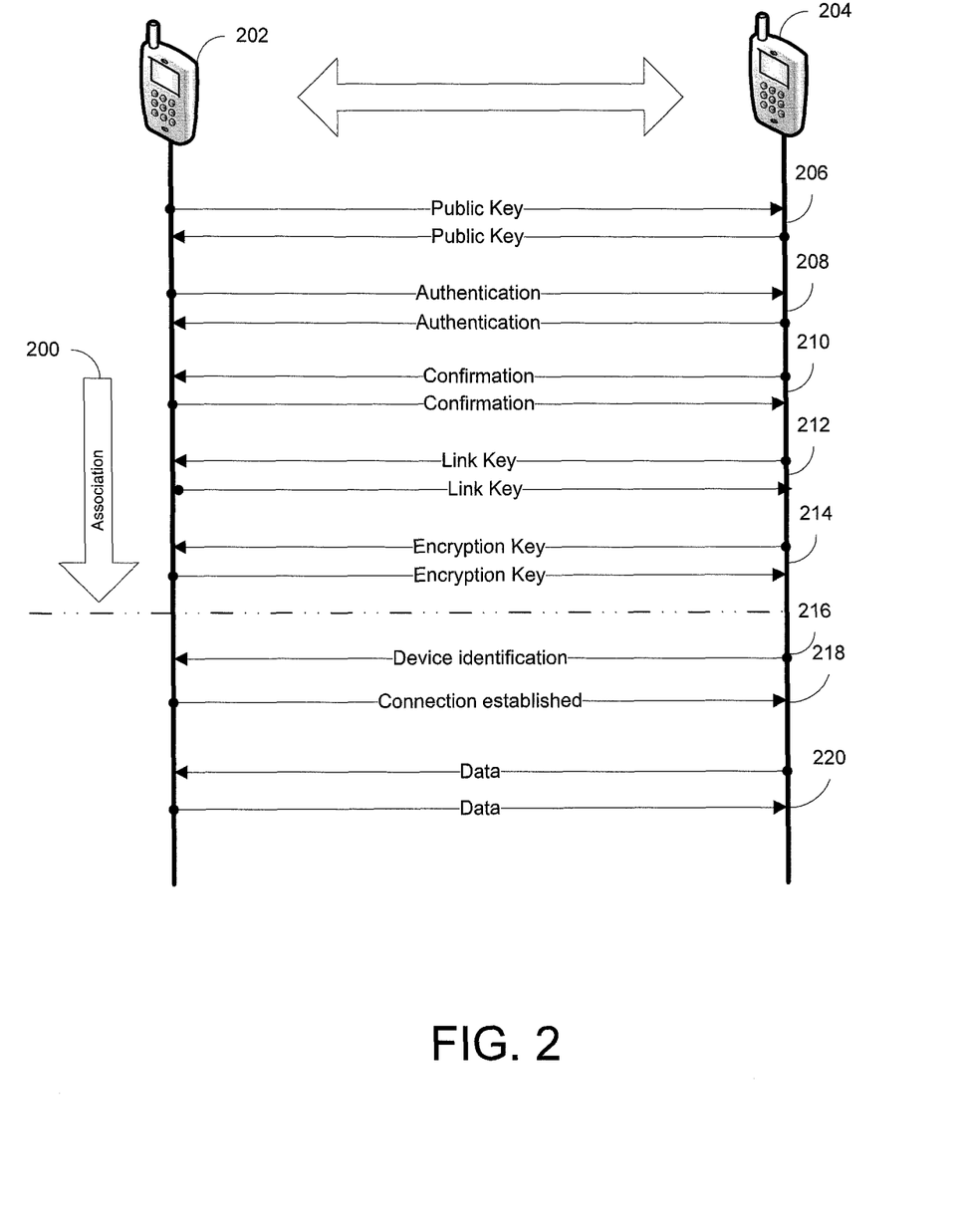
FIG. 2 depicts interactions between two mobile devices.

FIG. 2 describes an association 200 between a sending wireless device 202 and a receiving wireless device 204. When the sending wireless device 202 is in the radio coverage area provided by the receiving wireless device 204, the receiving wireless device 204 detects the presence of the sending wireless device 202, while the sending wireless device 202 discovers the presence of receiving wireless device 204. In the example of the Bluetooth™, the effective radio coverage area is a piconet. A Bluetooth™ device in discoverable mode transmits on demand information such as device name, device class, list of services, device features, manufacturer, Bluetooth™ specification used, etc.

Using the Bluetooth™ protocol as a non-limiting example, the sending wireless device 202 and the receiving wireless device 204 start to associate by first exchanging public keys 206. The public keys in general need to be generated only once per device and may be computed in advance of pairing. A device may, at any time, choose to discard its public-private key pair and generate a new one, although there is not a requirement to do so. Pairing is initiated by the initiating device sending its public key to the receiving device. The responding device replies with its own public key.

Using the exchanged public keys, each wireless device authenticates the other wireless device 208. A number of protocols are available for authentication, for example but not limited to, numeric comparison, out-of-band (OOB), Just Works, and passkey entry. The authentication generally results in a new shared key between the sending wireless device 202 and the receiving wireless device 204.

The sending wireless device 202 and the receiving wireless device 204 may further compute 210 a new confirmation value that includes the previously exchanged values and the newly derived shared key.

During the link key exchange 212, a link key, used to maintain the pairing, is computed by the sending wireless device 202 and the receiving wireless device 204 from the derived shared key and the previously publicly exchanged data.

Finally, an encryption key is generated 214 for the association 200 between the sending wireless device 202 and the receiving wireless device 204.

The above steps are described using the Bluetooth™ technology as an example, it should be apparent to a person skilled in the art that other technologies may be used for the short-range wireless system.

Once the sending wireless device 202 is associated with the receiving wireless device 204, an identification of the receiving wireless device 204 is sent to the sending wireless device 202 216 and a connection is established 218. If there is data to be sent, as described below, data is exchanged between the sending wireless device 202 and the receiving wireless device 204 220.

It should be apparent to a skilled artisan that many steps such as authentication, encryption may be optional as the requirements for the security vary from profile to profile. For example, if sending wireless device 202 is sending a music piece to the receiving wireless device 204, the data may not need to be encrypted, and the receiving wireless device 204 does not need to be authenticated. The exemplary Bluetooth™ services generally require either encryption or authentication, and as such require pairing before they allow a remote device to use the given service. However, some Bluetooth™ services elect not to explicitly require authentication or encryption so that pairing does not interfere with the user experience. For example, Secure Simple Paring (SSP) may use one of the associate models, numeric comparison, out-of-band (OOB), Just Works, and passkey entry as mentioned in the above, and reduces the number of steps with minimal or no user action. The user will have a smaller set of devices to access a particular service. With the Extended Inquiry Response (EIR) feature of Bluetooth™ specification 2.1+EDR, filtering of discovered devices is also possible based on the service class UUIDs present in the response, compared to the legacy Class of Device (CoD) based filtering.

The embodiments of the present patent disclosure as described below can be practiced in any short-range wireless system as long as the sending wireless device 202 and the receiving wireless device 204 are associated 200, and the receiving wireless device 204 is aware of the associated sending wireless device 202.

Figure 3:
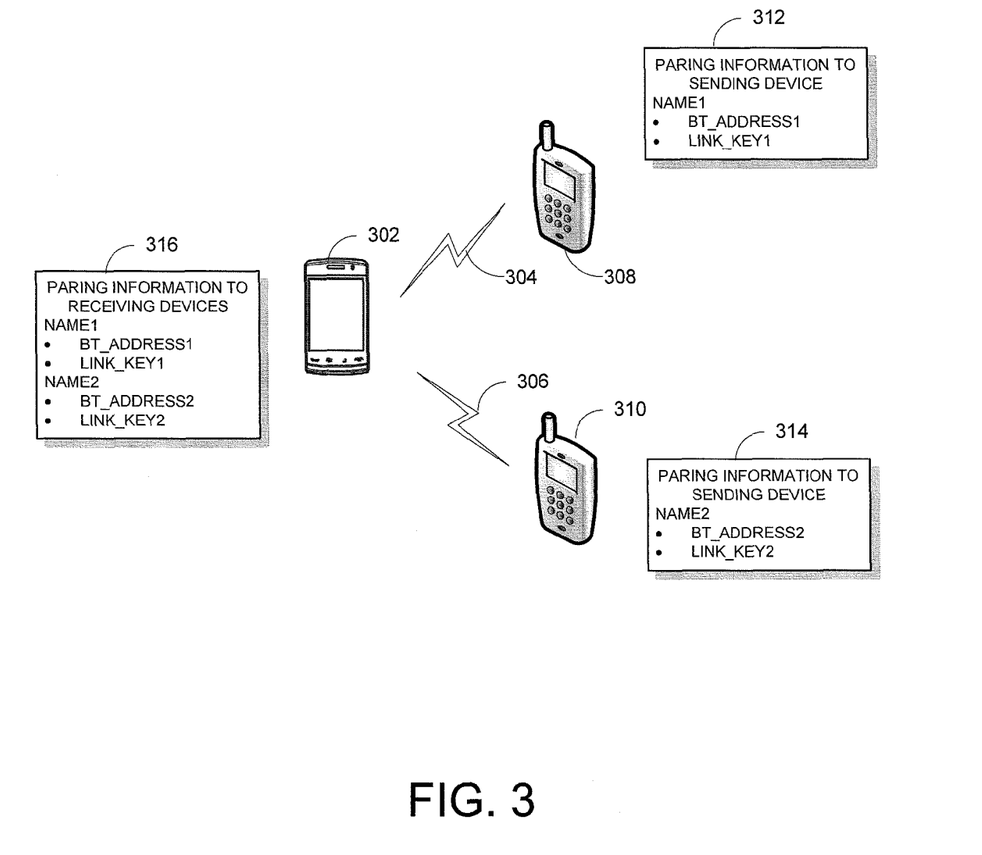
FIG. 3 shows a wireless accessory as an exemplary use of the wireless accessory of FIG. 1.

FIG. 3 shows according to an embodiment of the present patent disclosure, a sending wireless device 302 as an exemplary use of the wireless device of FIG. 1. The sending wireless device 302 may be in simultaneous communication via connections 304, 306 to a first receiving wireless device 308 and a second receiving wireless device 310.

The second receiving wireless device 310, may also be another type of device, for example, an MP3 player. Each of the first receiving wireless device 308 and the second receiving wireless device 310 contains pairing information 312, 314 that may be sent to the wireless accessory 302. The first receiving wireless device 308 may contain pairing information 312 for example, which may include a name of the sending wireless device 302, the Bluetooth™ address of the first receiving wireless device 308, and a link key that may be used for secure communication between the first receiving wireless device 308 and the sending wireless device 302. Similarly, the second receiving wireless device 310 may contain pairing information 314, for example, which may include a name of the sending wireless device 310, the Bluetooth™ address of the second receiving wireless device 310, and a link key that may be used for secure communication between the second receiving wireless device 310 and the sending wireless accessory 302. The names and Bluetooth™ addresses are passed to the sending wireless device 302 by each of the first receiving wireless device 308 and the receiving wireless device 310. The sending wireless device 302 stores the pairing information 316, including a name of each wireless accessory and a Bluetooth™ address for the receiving devices, that are passed to the first receiving wireless device 308 and the second mobile device 310. Each of the first mobile device 308 and the second receiving wireless device 310 negotiates a link key with the sending wireless device 302. The link keys are shared between paired devices, that is, there is a link key shared between the first receiving wireless device 308 and the sending wireless device 302, and a different link key shared between the second receiving wireless device 310 and the sending wireless device 302.

Figure 4:
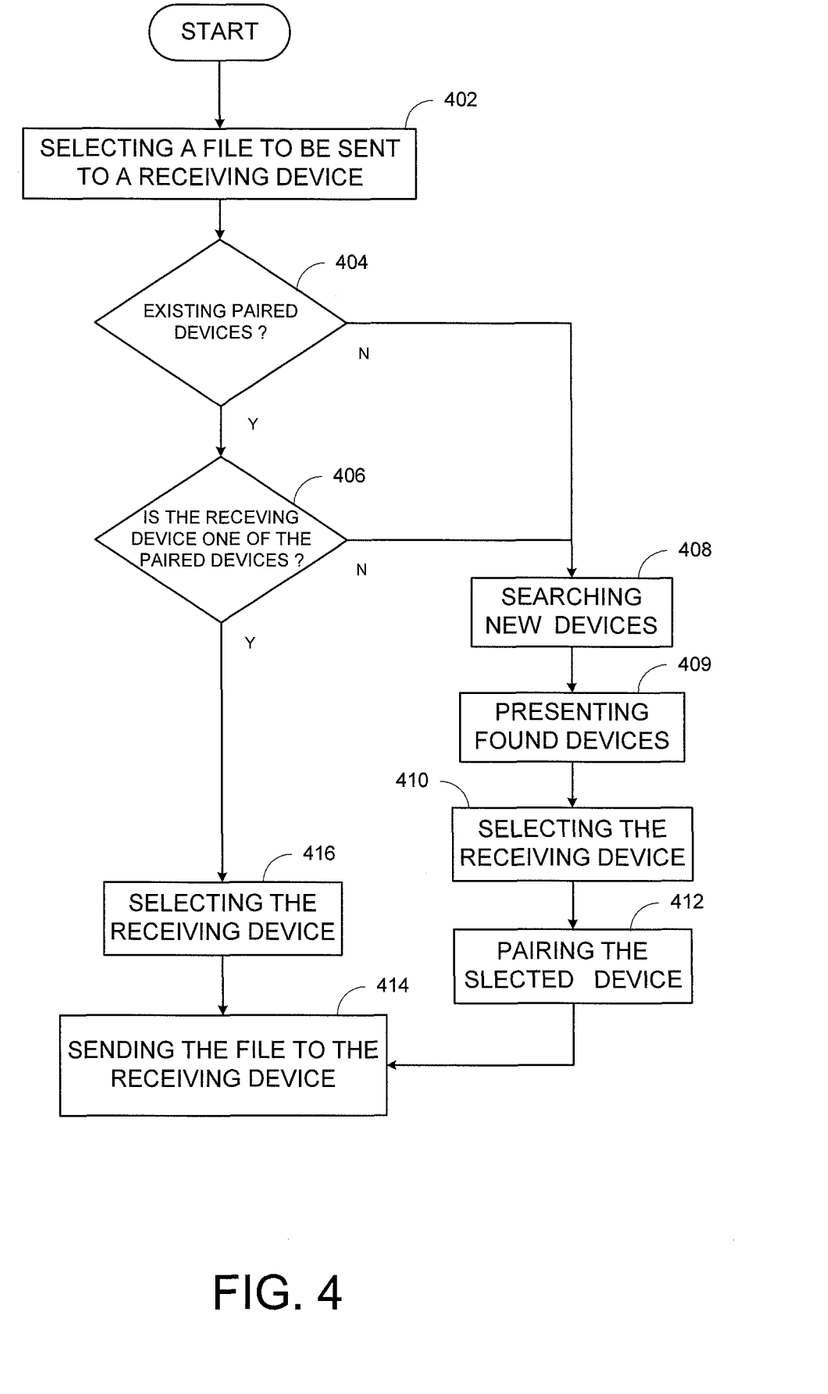
FIG. 4 depicts an exemplary flow diagram for sending a file from a wireless device to another wireless device, using Bluetooth™ as non-limiting example.

Referring to FIG. 4, an exemplary flow diagram for sending a file from a wireless device to another wireless device, using Bluetooth™ as non-limiting example, in accordance with an embodiment of the patent disclosure, is shown.

A file, for example, a picture, an audio or a video file, is selected at a wireless device to be sent to another wireless device, at 402. The sending wireless device checks to see whether there is a list of paired devices available, at 404. If there is no list for the paired device, or if the intended receiving device is not on the paired device list, at 406, the sending wireless device searches for new devices, at 408. At 409, the devises found are presented and at 410, a receiving device is selected from the found devices. The selected receiving device is then paired to the sending wireless device, at 412, and the file is sent from the sending wireless device to the receiving wireless device, at 414. If the receiving wireless device is one of the paired device, at 406, then the file is sent directly to the receiving device, at 414.

Figure 5:
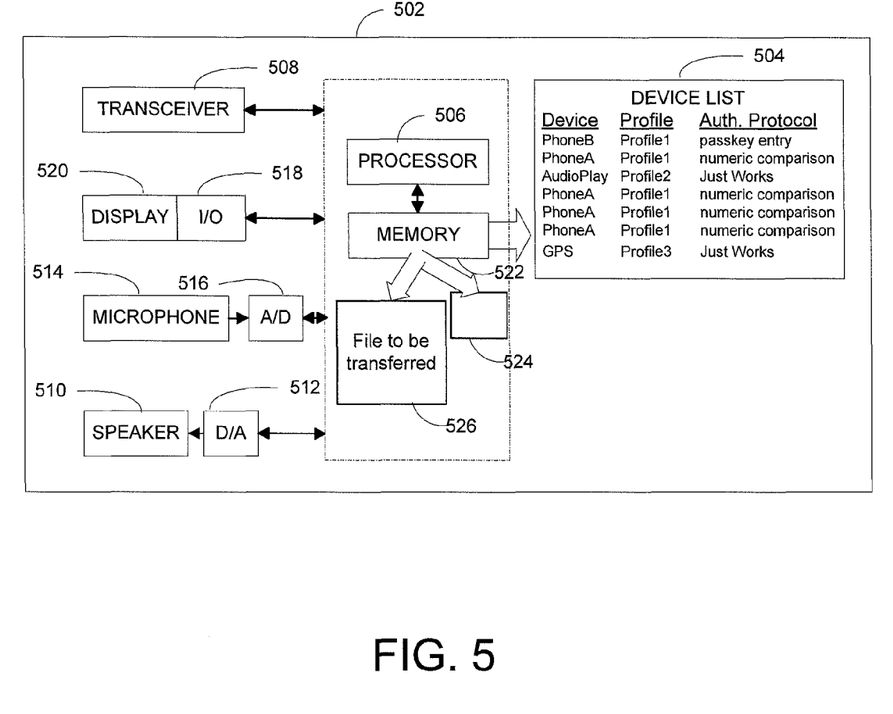
FIG. 5 is a block diagram illustrating an exemplary Bluetooth enabled wireless device.

FIG. 5 is a block diagram illustrating an exemplary Bluetooth™ enabled wireless device 502, in accordance with an embodiment of the patent disclosure. The wireless device 502 is capable of communication with another Bluetooth™ enabled wireless device for transmission and reception of, for example, picture, music, or other data.

The wireless device 502 that is capable of pairing with multiple wireless devices includes a processor 506 executing computer instructions. The processor 506 is also coupled to a transceiver 508 that is configured to transmit and receive signals from other wireless devices. The processor 506 may comprise suitable logic, circuitry, and/or code that may enable control and/or management operations in at least portions of the wireless device 502. Moreover, the processor 506 may be utilized to process data received by the wireless device 502 and/or to process data to be transmitted by wireless device 502.

The wireless device 502 may further include a speaker 510, a digital-to-analog converter (DAC) 512, a microphone 514, an analog-to-digital converter (ADC) 516, and at least one user I/O device 518. The user I/O device 518 may comprise, for example, a button, a scroll wheel, a keyboard, an optical trackpad, a trackball, a joystick, and/or a touch screen display that may be used to input or output information. For example, a button may be used to select the receiving wireless device from the paired device list. The button may be a hardware button or a software enabled button. The display 520 may, for example, show the paired device list. Bluetooth™ software may be stored in the memory 522, where the Bluetooth™ software may comprise at least some layers of Bluetooth™ protocol. The layers of Bluetooth™ protocol may comprise, for example, logical link control and adaptation protocol (L2CAP), RFCOMM protocol, and service discovery protocol (SDP).

The memory 522 is configured to store data, which may include a paired device list 504. The memory may further include computer executable code 524 for executing a method according to the embodiments described herein in the processor 506. The memory 522 may further hold the file 526 to be transferred.

The paired device list 504 may include device names, profile types, and other data relating to devices recently connected to the wireless accessory 502. The paired device list 504 may list a plurality of paired devices. For example, the device list 504 may list phone A, phone B, phone C, an audio player, and a GPS, each type of device may have a particular profile.

The paired device list 504 lists a profile type for each device. For example, phone A and the phone B may connect to the wireless device 502, according to Profile 1.

The paired device list 504 may further include an authentication protocol for each listed device. In FIG. 5, cell phone B uses passkey entry while phone A uses numeric comparison.

It should be apparent to a person skilled in the art that the device list 504 is only a non-limiting example. Other parameters may also be used.

FIGS. 6-12 show examples of user interface in accordance with one embodiment of the present patent disclosure. Referring to FIG. 4 and FIGS. 6-12, sending a file from a sending wireless device to a receiving wireless device, in accordance with an embodiment of the patent disclosure using the non-limiting example of Bluetooth™, is shown.

Figure 6:
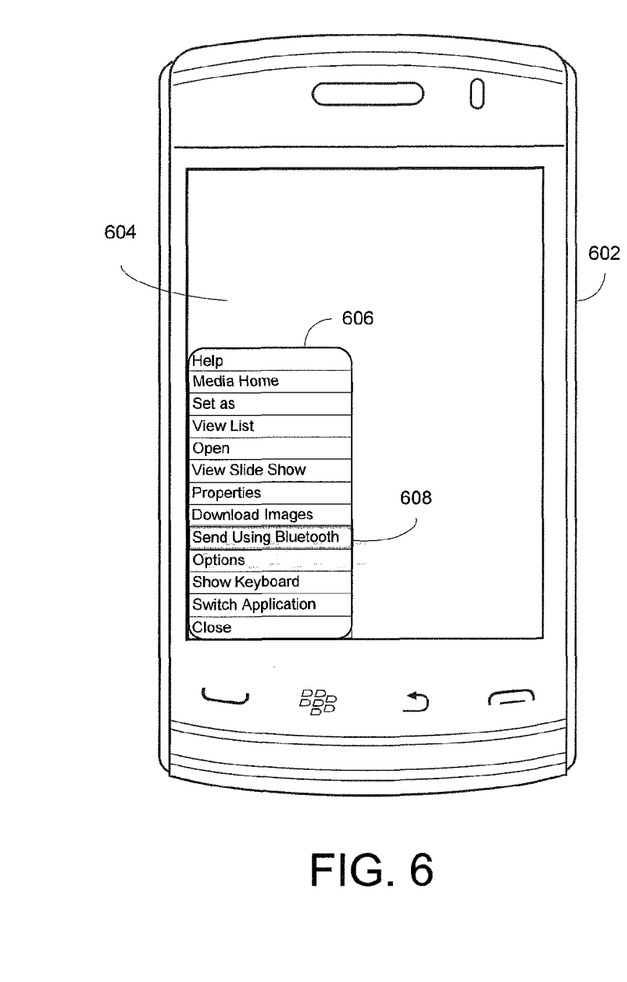
FIGS. 6-12 show exemplary user interfaces in accordance with another embodiment.
Figure 7:
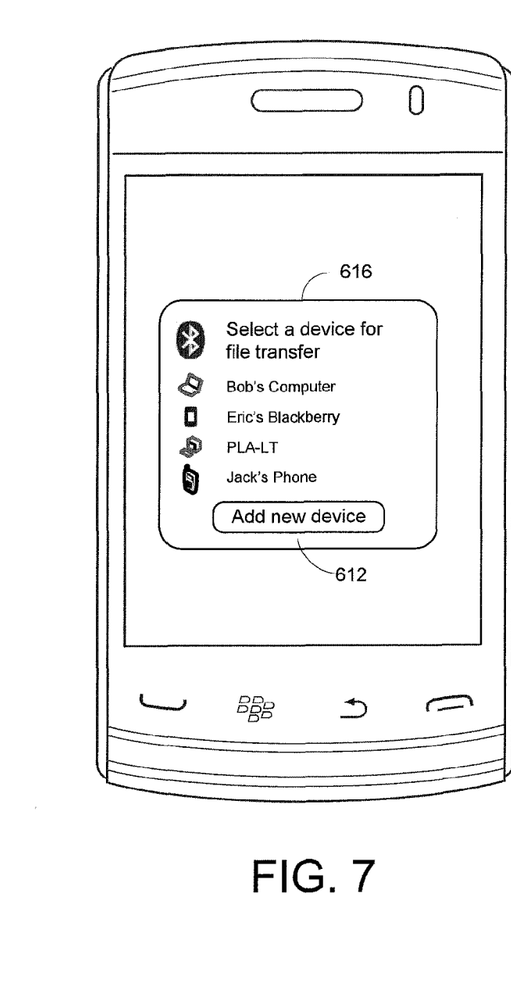
Figure 8:
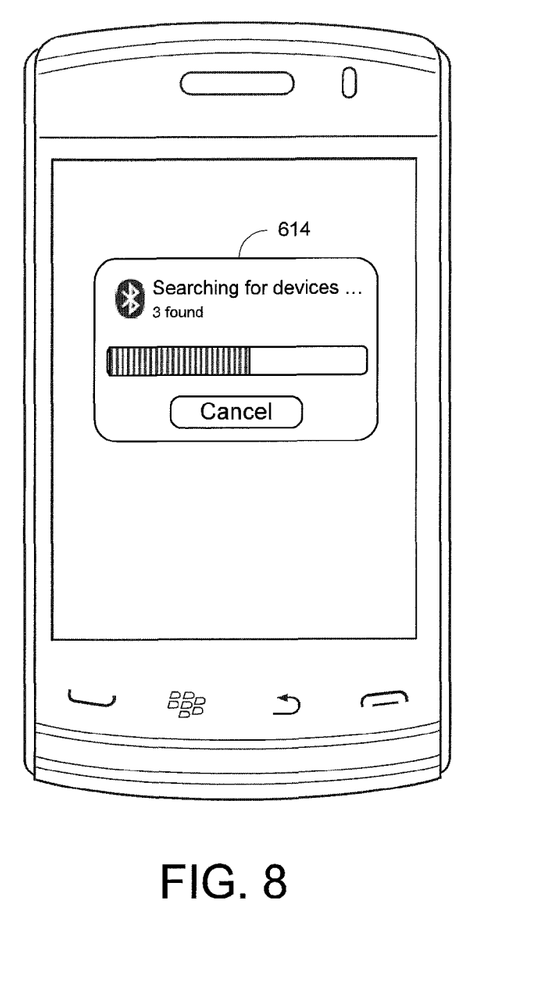

Referring to FIG. 4 and FIG. 6, on the sending wireless device 602, a user may decide to share a picture 604 with her friend. The user selects 402 the picture either in the viewing area or from a file list. The menu 606 provides an option 608 to "Send Using Bluetooth". Referring to FIG. 4 and FIG. 7, after the user selects the sending using Bluetooth option, a list 616 of paired devices is presented. If the intended receiving wireless device is not on the list 616, the user may select the "Add new device" 612. Referring to FIG. 4 and FIG. 8, the sending wireless device 602 then searches 614 for new devices 408.

Figure 9:
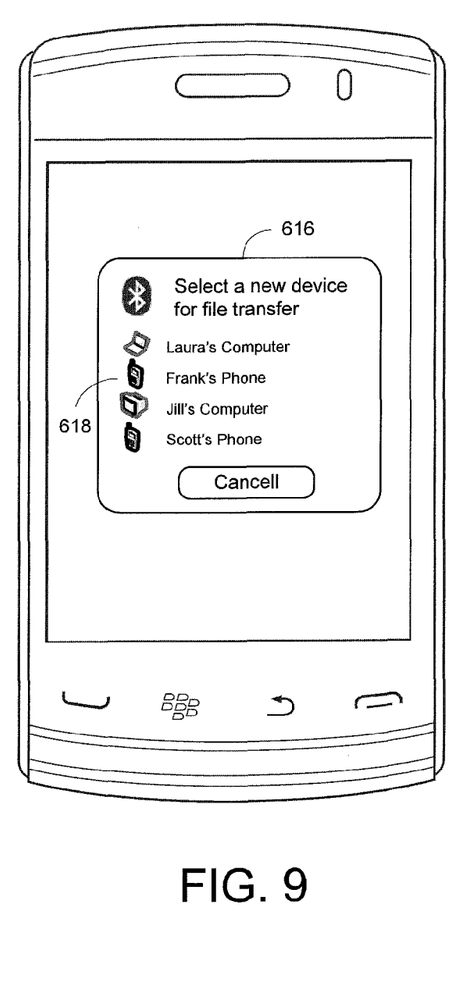
Figure 10:
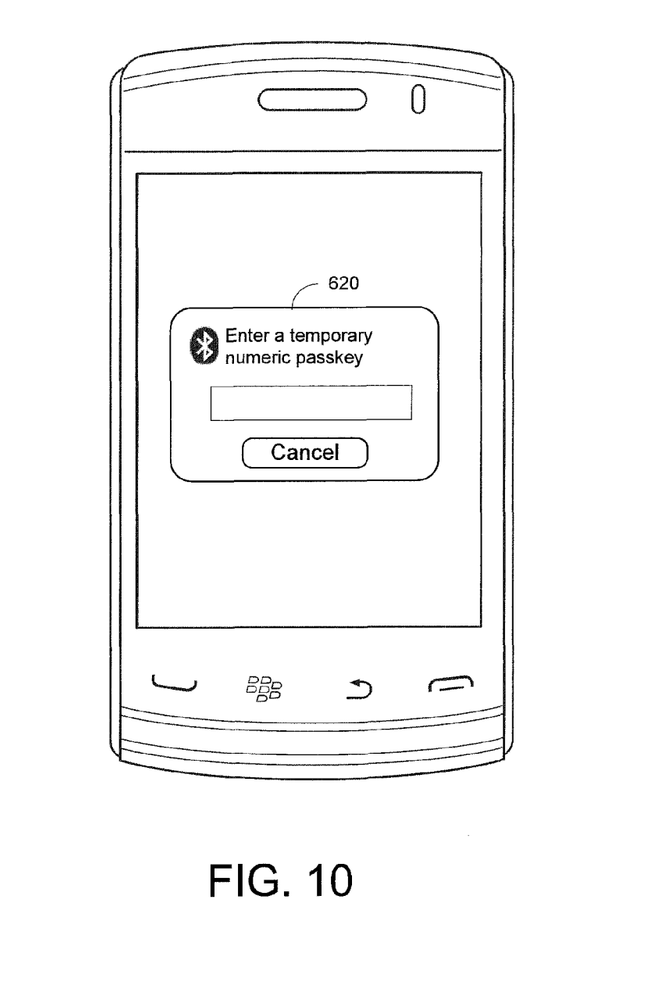
Figure 11:
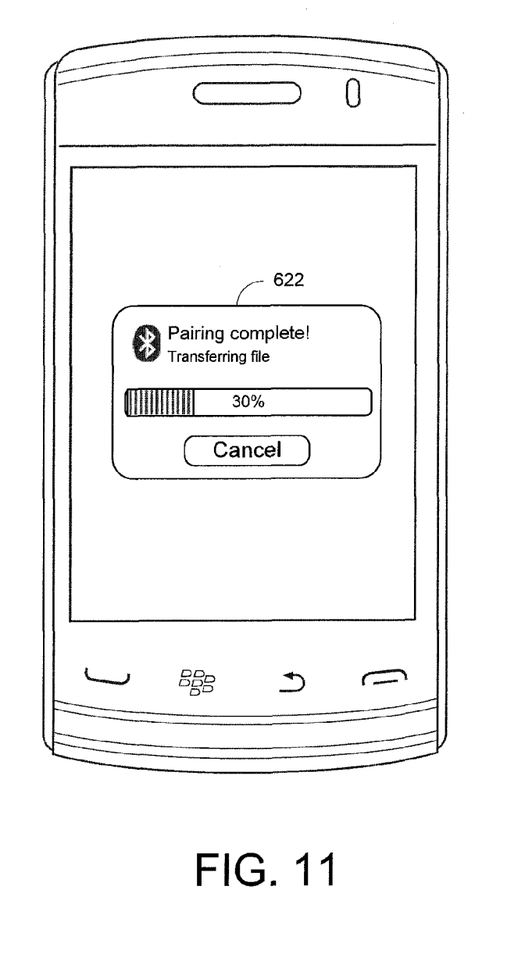
Figure 12:
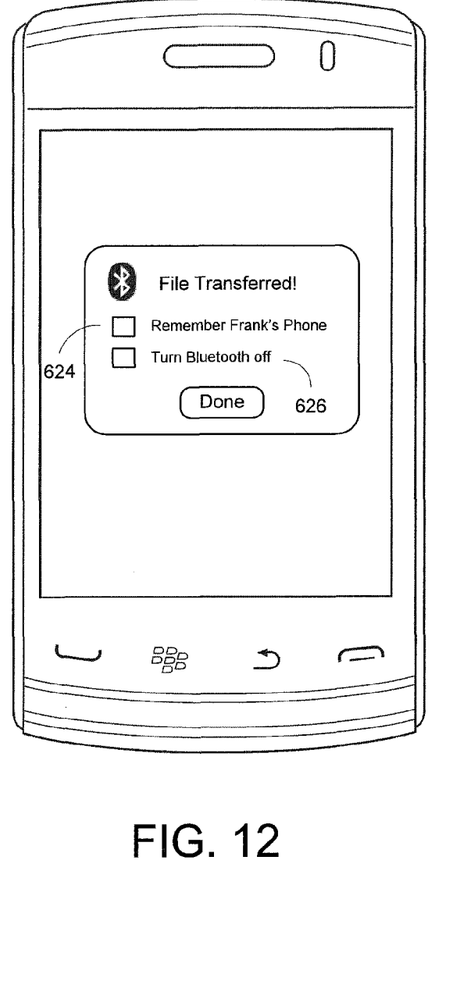

Referring to FIG. 4 and FIG. 9, a list 616 of newly found devices is presented to the user. The user may select 410 a receiving wireless device 618. If the authentication is numeric passkey, referring to FIG. 4 and FIG. 10, the user enters a temporary numeric passkey 620 and the receiving wireless device and sending wireless device are paired 412. Referring to FIG. 4 and FIG. 11, the file is then sent to the receiving wireless device 414, 622. Referring to FIG. 5 and FIG. 12, after the transfer the user is offered the options remember the recent receiving wireless device 624, whereby the new receiving wireless device will be added to the paired device list 504, and to turn the Bluetooth off 626.

While the patent disclosure is described in conjunction with the specific embodiments, it will be understood that it is not intended to limit the patent disclosure to the described embodiments. On the contrary, it is intended to cover alternatives, modifications, and equivalents as may be included within the scope of the patent disclosure as defined by the appended claims. In the above description, numerous specific details are set forth in order to provide a thorough understanding of the present patent disclosure. The present patent disclosure may be practiced without some or all of these specific details. In other instances, well-known process operations have not been described in detail in order not to unnecessarily obscure the present patent disclosure.

The terminology used herein is for the purpose of describing particular embodiments only and is not intended to be limiting of the patent disclosure. As used herein, the singular forms "a", "an" and "the" are intended to include the plural forms as well, unless the context clearly indicates otherwise.

It will be further understood that the terms "comprises" or "comprising", or both when used in this specification, specify the presence of stated features, integers, steps, operations, elements, and/or components, but do not preclude the presence or addition of one or more other features, integers, steps, operations, elements, components, and/or groups thereof.

Embodiments within the scope of the present patent disclosure can be implemented in digital electronic circuitry, or in computer hardware, firmware, software, or in combinations thereof. Apparatus within the scope of the present patent disclosure can be implemented in a computer program product tangibly embodied in a machine-readable storage medium for execution by a programmable processor; and method actions within the scope of the present patent disclosure can be performed by a programmable processor executing a program of instructions to perform functions of the patent disclosure by operating on input data and generating output. Embodiments within the scope of the present patent disclosure may be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files. Embodiments within the scope of the present patent disclosure include computer-readable media for carrying or having computer-executable instructions, computer-readable instructions, or data structures stored thereon. Such computer-readable media may be any available media, which is accessible by a general-purpose or special-purpose computer system. Examples of computer-readable media may include physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system. Any of the foregoing can be supplemented by, or incorporated in, ASICs (application-specific integrated circuits). It should be understood that embodiments of the present patent disclosure may be used in a variety of applications. Although the present patent disclosure is not limited in this respect, the methods disclosed herein may be used in many apparatuses such as in the transmitters, receivers and transceivers of a radio system. Radio systems intended to be included within the scope of the present patent disclosure include, by way of example only, cellular radiotelephone communication systems, satellite communication systems, two-way radio communication systems, one-way pagers, two-way pagers, personal communication systems (PCS), personal digital assistants (PDA's), notebook computers in wireless local area networks (WLAN), wireless metropolitan area networks (WMAN), wireless wide area networks (WWAN), or wireless personal area networks (WPAN, and the like).

What is claimed is:

1. A method of transferring a file from a sending wireless device to a target receiving wireless device in a short-range wireless system, the method comprising:
   receiving, on the sending wireless device, a selection of a file to be sent to the target receiving wireless device, the file being an image file, an audio file or a video file;
   displaying, on the sending wireless device, a list of receiving wireless devices that have a stored paired connection with the sending wireless device;
   identifying at least one new wireless device based on an indication that the target receiving wireless device is not in the displayed list;
   receiving a selection of at least one new wireless device as the target receiving wireless device;
   establishing a paired connection between the sending wireless device and the target receiving wireless device;
   sending the file to the target receiving wireless device once the new pairing connection has been established;
   after the file has been sent to the target receiving wireless device, displaying, on the sending wireless device, a user selectable option configured to initiate an operation to store pairing information related to the target receiving wireless device and to add the target receiving wireless device to the list of receiving wireless devices that have a stored paired connection with the sending wireless device;
   detecting a selection of the user selectable option; and
   storing the pairing information related to the target receiving wireless device such that the target receiving wireless device is configured to be in paired connection with the sending wireless device.

2. The method according to claim 1, wherein the short-range wireless system is a Bluetooth™ system; and the establishing a new pairing connection comprises pairing the sending wireless device with the target receiving wireless device.

3. The method according to claim 1, wherein the short-range wireless system uses one of Infrared Data Association (IrDA), Ultra-Wideband (UWB), Z-Wave and ZigBee.

4. The method according to claim 1, wherein the short-range wireless system is a wireless personal area network (PAN).

5. The method according to claim 1 wherein the receiving mobile device is one of a mobile phone, an audio player, an adapter for portable devices, an adapter for home entertainment device, a personal computer, a personal digital assistants (PDA), a digital camera, a Global Positioning System (GPS) and a video game console.

6. The method according to claim 1, further comprising:
   receiving, on the sending wireless device, a selection of a second file to be sent to the target receiving wireless device;
   displaying, on the sending wireless device, a revised list of receiving wireless devices that have a stored paired connection with the sending wireless device, wherein the revised list includes the target receiving wireless device;
   detecting a selection of the target receiving wireless device; and
   sending the file to the target receiving wireless device based on the stored pairing information related to the target receiving wireless device.

7. The method according to claim 1, wherein the storing of the pairing information comprises:
   determining an authentication protocol for the target receiving wireless device; and
   storing data necessary for authentication pursuant to the determined authentication protocol, such that the target receiving wireless device can avoid a requirement to be reauthenticated for subsequent file transfers.

8. The method of claim 1, wherein the paring information comprises a name of the target wireless receiving device and an address for the target receiving wireless device.

9. A wireless device used in a short-range wireless system, the wireless device comprising:
a transceiver configured for communicating with a target receiving wireless device;
a memory including a list of receiving wireless devices that have a paired connection with the wireless device; and
a processor electrically coupled with the transceiver and the memory, the processor configured for:
receiving a selection of a file to be sent to the target receiving wireless device, the file being an image file, an audio file or a video file;
displaying, on a display of the wireless device, the list of receiving wireless devices that have a stored paired connection with the wireless device;
identifying at least one new wireless device based on an indication that the target receiving wireless device is not in the displayed list;
receiving a selection of at least one new wireless device as the target receiving wireless device;
establishing a paired connection with the target receiving wireless device;
sending the file to the target receiving wireless device once the new pairing connection has been established;
after the file has been sent to the target receiving wireless device, displaying, on the display of the wireless device, a user selectable option configured to initiate an operation to store pairing information related to the target receiving wireless device and to add the target receiving wireless device to the list of receiving wireless devices that have a stored paired connection with the wireless device;
detecting a selection of the user selectable option; and
storing the pairing information related to the target receiving wireless device such that the target receiving wireless device is configured to be in paired connection with the sending wireless device.

10. The wireless device according to claim 9, wherein the short-range wireless system is a Bluetooth™ system; and the establishing a new pairing connection comprises pairing the wireless device with the target receiving wireless device.

11. The wireless device according to claim 9, wherein the short-range wireless system uses Infrared Data Association (IrDA), Ultra-Wideband (UWB), Z-Wave or ZigBee.

12. The wireless device according to claim 9, wherein the short-range wireless system is a wireless personal area network (PAN).

13. The wireless device according to claim 9, wherein the target receiving wireless device is one of a mobile phone, an audio player, an adapter for portable devices, an adapter for home entertainment device, a personal computer, a personal digital assistants (PDA), a digital camera, a Global Positioning System (GPS) and a video game console.

14. The wireless device according to claim 9, wherein the processor is further configured to:
receive, on the sending wireless device, a selection of a second file to be sent to the target receiving wireless device;
display, on the sending wireless device, a revised list of receiving wireless devices that have a stored paired connection with the sending wireless device, wherein the revised list includes the target receiving wireless device;
detect a selection of the target receiving wireless device; and
send the file to the target receiving wireless device based on the stored pairing information related to the target receiving wireless device.

15. The wireless device according to claim 9, wherein the storing of the pairing information comprises:
determining an authentication protocol for the target receiving wireless device; and
storing data necessary for authentication pursuant to the determined authentication protocol, such that the target receiving wireless device can avoid a requirement to be reauthenticated for subsequent file transfers.

16. The wireless device according to claim 9, wherein the paring information comprises a name of the target wireless receiving device and an address for the target receiving wireless device.

17. A non-transitory computer readable storage medium storing instructions executable by a processor of a wireless device which, when executed cause the wireless device to:
receive a selection of a file to be sent to a target receiving wireless device, the file being an image file, an audio file or a video file;
display, on a display of the wireless device, a list of receiving wireless devices that have a stored paired connection with the wireless device;
identify at least one new wireless device based on an indication that the target receiving wireless device is not in the displayed list;
receive a selection of the at least one new wireless device as the target receiving wireless device;
establish a paired connection with the target receiving wireless device;
send the file to the target receiving wireless device once the new pairing connection has been established;
after the file has been sent to the target receiving wireless device, display, on the display of the wireless device, a user selectable option configured to initiate an operation to store pairing information related to the target receiving wireless device and to add the target receiving wireless device to the list of receiving wireless devices that have a stored paired connection with the wireless device;
detect a selection of the user selectable option; and
store the pairing information related to the target receiving wireless device such that the target receiving wireless device is configured to be in paired connection with the sending wireless device.

18. The computer readable storage medium according to claim 17, wherein the short-range wireless system is a Bluetooth™ system; and the establishing a new pairing connection comprises pairing the wireless device with the target receiving wireless device.

19. The computer readable storage medium according to claim 17, wherein the short-range wireless system uses one of Infrared Data Association (IrDA), Ultra-Wideband (UWB), Z-Wave and ZigBee.

20. The computer readable storage medium according to claim 17, wherein the short-range wireless system is a wireless personal area network (PAN).

21. The computer readable storage medium according to claim 17, wherein the target receiving wireless device is one of a mobile phone, an audio player, an adapter for portable devices, an adapter for home entertainment device, a personal computer, a personal digital assistants (PDA), a digital camera, a Global Positioning System (GPS) and a video game console.

22. The computer readable storage medium according to claim 17, wherein the instructions further cause the device to:
- receive, on the sending wireless device, a selection of a second file to be sent to the target receiving wireless device;
- display, on the sending wireless device, a revised list of receiving wireless devices that have a stored paired connection with the sending wireless device, wherein the revised list includes the target receiving wireless device;
- detect a selection of the target receiving wireless device; and
- send the file to the target receiving wireless device based on the stored pairing information related to the target receiving wireless device.

23. The computer readable storage medium according to claim 17, wherein the storing of the pairing information comprises:
- determining an authentication protocol for the target receiving wireless device; and
- storing data necessary for authentication pursuant to the determined authentication protocol, such that the target receiving wireless device can avoid a requirement to be reauthenticated for subsequent file transfers.

24. The computer readable storage medium according to claim 17, wherein the pairing information comprises a name of the target wireless receiving device and an address for the target receiving wireless device.

* * * * *